(12) United States Patent
Alexander et al.

(10) Patent No.: US 8,707,693 B2
(45) Date of Patent: Apr. 29, 2014

(54) VEHICLE ENERGY HARVESTING DEVICE HAVING A CONTINUOUS LOOP OF SHAPE MEMORY ALLOY

(75) Inventors: Paul W. Alexander, Ypsilanti, MI (US); Alan L. Browne, Grosse Pointe, MI (US); Nancy L. Johnson, Northville, MI (US); Nilesh D. Mankame, Ann Arbor, MI (US); Geoffrey P. McKnight, Los Angeles, CA (US); Andrew C. Keefe, Encino, CA (US); Christopher P. Henry, Thousand Oaks, CA (US); Nicholas W Pinto, IV, Ferndale, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 750 days.

(21) Appl. No.: 12/947,868

(22) Filed: Nov. 17, 2010

(65) Prior Publication Data

US 2011/0124452 A1    May 26, 2011

Related U.S. Application Data

(60) Provisional application No. 61/263,162, filed on Nov. 20, 2009, provisional application No. 61/263,177, filed on Nov. 20, 2009.

(51) Int. Cl.
*F01B 29/10*    (2006.01)
*F02G 1/04*    (2006.01)
*F01N 5/02*    (2006.01)
*F02G 3/00*    (2006.01)
*F01N 3/02*    (2006.01)

(52) U.S. Cl.
USPC ................................. 60/527; 60/616; 60/320

(58) Field of Classification Search
USPC ............ 60/527–529; 474/139, 134, 136, 137; 310/306, 307
See application file for complete search history.

(56) References Cited

U.S. PATENT DOCUMENTS 298,291 A * 5/1884 Cromie ......................... 474/136
3,949,573 A * 4/1976 Jacobsson .................... 66/132 T
(Continued)

FOREIGN PATENT DOCUMENTS

DE    10108468 A1    9/2002
JP    60022079 A     2/1985
(Continued)

OTHER PUBLICATIONS

Kauffman, George B. Memory Metal, Oct. 1993. American Chemical Society. ChemMatters, p. 4.*

*Primary Examiner* — Thomas Denion
*Assistant Examiner* — Brian Inacay
(74) *Attorney, Agent, or Firm* — Quinn Law Group, PLLC

(57) ABSTRACT

An energy harvesting system comprises a first region and a second region having a temperature difference therebetween. A plurality of heat engines are located proximate to the conduit and configured for converting thermal energy to mechanical energy. The heat engines each include a shape memory alloy forming at least one generally continuous loop. The shape memory alloy driven to rotate by heat exchange contact with each of the first region and the second region. At least one pulley for each of the plurality of heat engines is driven by the rotation of the respective shape memory alloy, and each of the at least one pulleys is operatively connected to a component to thereby drive the component.

12 Claims, 4 Drawing Sheets

(56) References Cited

U.S. PATENT DOCUMENTS

| | | | |
|---|---|---|---|
| 4,150,544 A | | 4/1979 | Pachter |
| 4,275,561 A | * | 6/1981 | Wang .............................. 60/527 |
| 4,472,939 A | * | 9/1984 | Wang .............................. 60/527 |
| 5,442,914 A | | 8/1995 | Otsuka |
| 6,086,494 A | * | 7/2000 | Crosta ............................ 474/88 |
| 7,444,350 B1 | | 10/2008 | MacKinnon et al. |
| 8,590,303 B2 | * | 11/2013 | Alexander et al. .............. 60/527 |
| 2008/0264058 A1 | * | 10/2008 | Broer et al. ..................... 60/527 |

FOREIGN PATENT DOCUMENTS

| | | |
|---|---|---|
| JP | 5118272 A | 5/1993 |
| JP | 2003232276 A | 8/2003 |
| JP | 2005002978 A | 1/2005 |

* cited by examiner

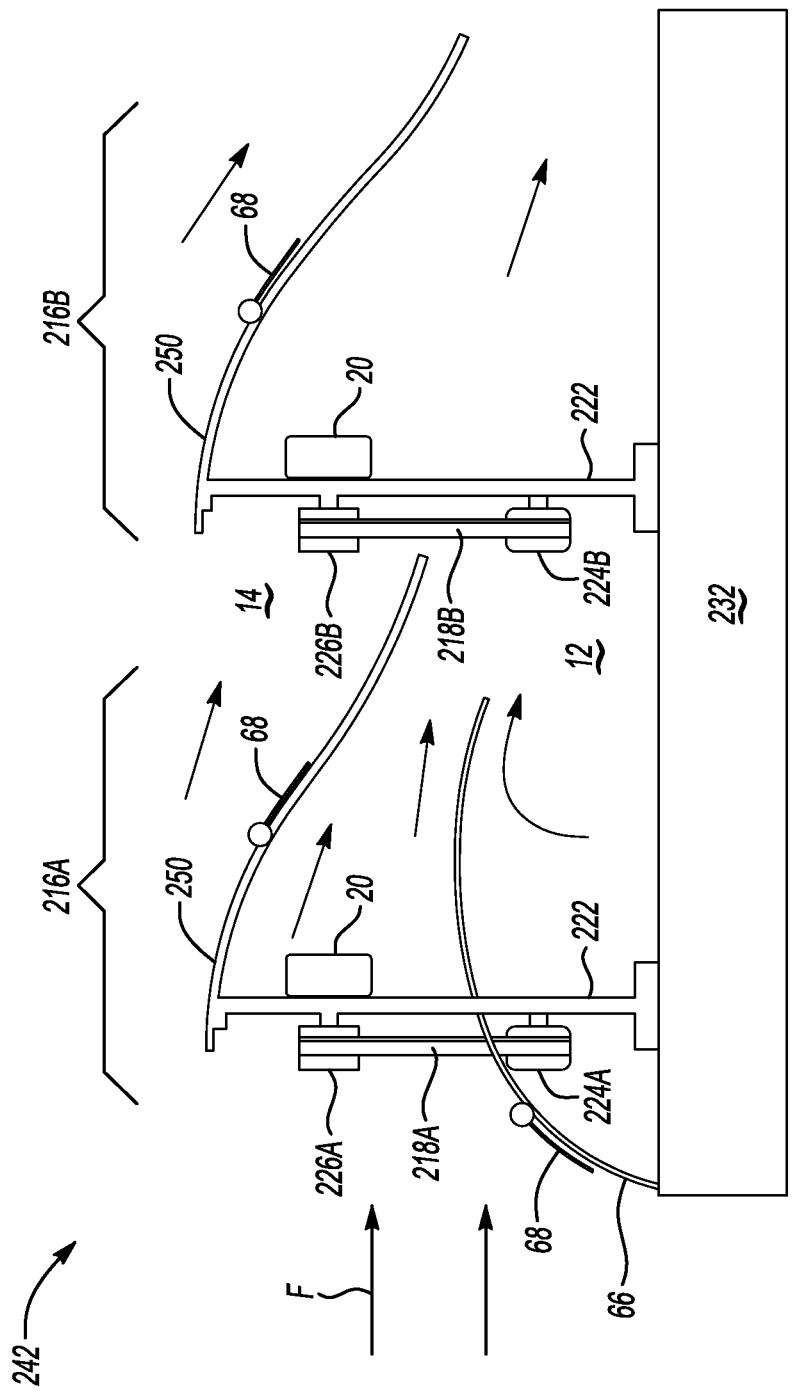

VEHICLE ENERGY HARVESTING DEVICE HAVING A CONTINUOUS LOOP OF SHAPE MEMORY ALLOY

CROSS REFERENCE TO RELATED APPLICATIONS

This application claims the benefit of U.S. Provisional Application Ser. No. 61/263,162 filed Nov. 20, 2009 and U.S. Provisional Patent Application Ser. No. 61/263,177, filed on Nov. 20, 2009, the entire contents of which are hereby incorporated by reference.

TECHNICAL FIELD

The present invention generally relates to a vehicle, and more specifically, to an energy source for the vehicle and vehicle accessories.

BACKGROUND

Vehicles are traditionally powered by engines that drive the vehicle and batteries that provide power for starting the engine and for vehicle accessories. Advancements in technology and a desire for driver conveniences have increased the number of vehicle accessories, as well as increased the load, i.e., power demand, on the engine and/or the battery required to power the vehicle accessories. In addition, the vehicle power sources and components produce a large quantity of waste heat, i.e., waste thermal energy that is typically dissipated into the atmosphere and lost.

Accordingly, arrangements for extending driving range and increasing the fuel efficiency of the vehicle are desirable. Therefore, systems that increase the fuel efficiency of the vehicle and reduce the power load on the vehicle's traditional power sources, i.e., the engine and/or the battery, are desirable, and significant vehicle fuel economy gains may be realized if even just a few percent of the vehicle's waste heat is converted into usable mechanical and/or electrical energy.

SUMMARY

An energy harvesting system comprises a first region and a second region having a temperature difference therebetween. A conduit is located at least partially within the first region. A plurality of heat engines are located proximate to the conduit and configured for converting thermal energy to mechanical energy. The heat engines each include a shape memory alloy forming at least one generally continuous loop. The loop of shape memory alloy is driven to rotate by heat exchange contact with the first region and the second region. At least one pulley for each of the plurality of heat engines is driven by the rotation of the respective loop of shape memory alloy, and each of the at least one pulleys is operatively connected to a component to thereby drive the component.

A method of harvesting energy comprises driving a plurality of heat engines to convert thermal energy to mechanical energy. Driving the plurality of heat engines includes exposing localized regions of a continuous loop of a shape memory alloy of each of the plurality of heat engines to heat exchange contact with a first region and a second region having temperature difference therebetween. The continuous loop of the shape memory alloy for each of the plurality of heat engines has a crystallographic phase changeable between austenite and martensite in response to the temperature difference between the first region and the second region. With the loop in tension, the localized regions of each continuous loop of the shape memory alloy are expanded and contracted in response to the temperature difference between the first region and the second region. Each continuous loop of the shape memory alloy is rotated in response to expanding and contracting the localized regions. At least one pulley is rotated by the plurality of heat engines and a component is driven by the rotation of the at least one pulley.

A vehicle comprises a conduit for the vehicle and a first region and a second region having a temperature difference therebetween. The first region surrounds the conduit, and the second region at least partially surrounds the first region. A plurality of heat engines are configured for converting thermal energy to mechanical energy. Each of the plurality of heat engines includes a plurality of inner pulleys concentrically located about the conduit and a plurality of outer pulleys concentrically located about the conduit in an alternating relationship with the inner pulleys. At least one continuous loop of a shape memory alloy is alternately threaded about an interior of the plurality of inner pulleys and an exterior of the outer pulleys surrounding the conduit. The shape memory alloy is disposed in heat exchange contact with the first region and the second region such that at least one of the plurality of inner pulleys and the plurality of outer pulleys is driven to rotate by the tensioned shape memory alloy in response to the temperature difference between the first region and the second region. A component of the vehicle is driven by the rotation of the at least one of the plurality of inner pulleys and the plurality of outer pulleys. A first of the plurality of heat engines is arranged concentrically about the conduit and the remaining plurality of heat engines are successively arranged concentrically about one another.

The above features and advantages, and other features and advantages of the present invention will be readily apparent from the following detailed description of the preferred embodiments and best modes for carrying out the present invention when taken in connection with the accompanying drawings and appended claims.

BRIEF DESCRIPTION OF THE DRAWINGS

FIG. 4 is a schematic side view of a third embodiment of the energy harvesting system of FIG. 1.

DETAILED DESCRIPTION

Figure 1:
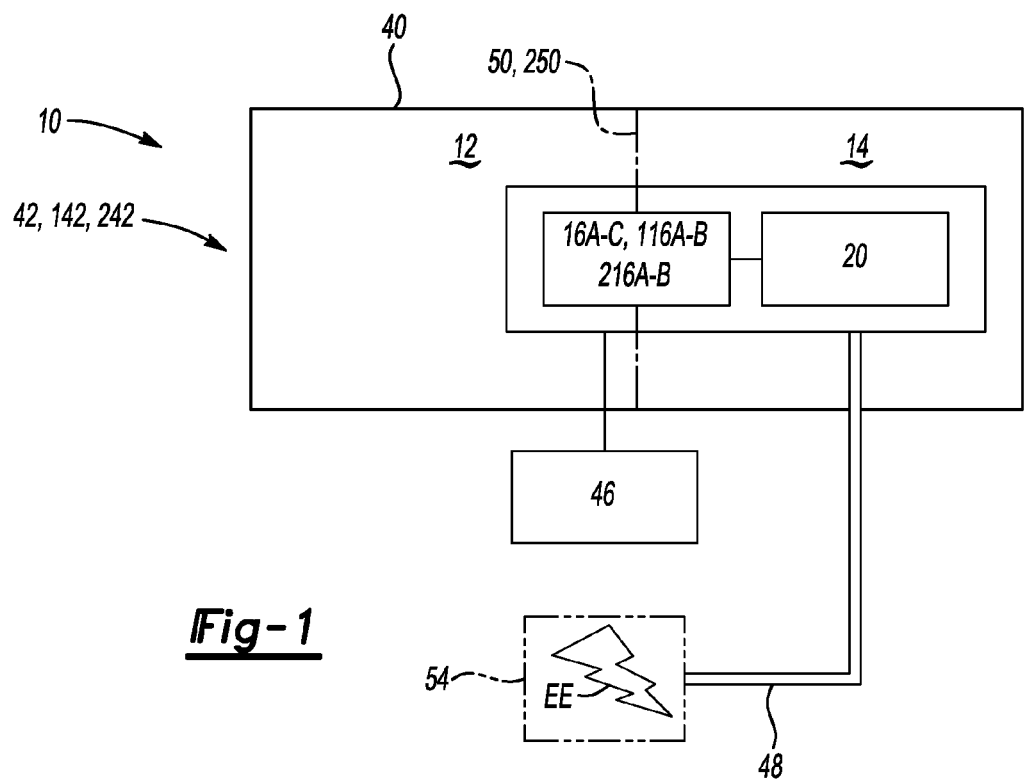
FIG. 1 is a schematic diagram of a vehicle having an energy harvesting system.

Referring to the Figures, wherein like reference numerals refer to like elements, a vehicle is shown generally at 10 in FIG. 1. The vehicle 10 includes an energy harvesting system 42, 142, 242. The energy harvesting system 42, 142, 242 utilizes the temperature difference between a first region 12 and a second region 14 to generate mechanical or electrical energy, and therefore may be useful for automotive applications. However, it is to be appreciated that the energy harvesting system 42, 142, 242 may also be useful for non-automotive applications. The energy harvesting system 42, 142, 242 includes a heat engine 16, 116, 216. The heat engine 16, 116, 216 is configured for converting thermal energy, e.g., heat, to mechanical or heat to mechanical and then to electrical energy, as set forth in more detail below.

The vehicle 10 defines a compartment 40 which may house power and drive sources for the vehicle 10, such as an engine and transmission (not shown). The compartment 40 may or may not be enclosed from the surrounding environment, and may include regions and components exterior to the vehicle 10 such as an exhaust pipe and catalytic converter, shock absorbers, brakes, and any other region where energy is dissipated as heat proximate to or in the vehicle 10 such as in a passenger compartment, engine compartment, or a battery compartment (such as in an electric vehicle).

The energy harvesting system 42, 142, 242 is at least partially located within the compartment 40. The power and drive sources (not shown) for the vehicle 10 typically generate heat. Therefore, the compartment 40 includes the first region 12 and the second region 14 having a temperature difference therebetween. The first region 12 and the second region 14 may be spaced apart from one another to provide a sufficient heat exchange barrier 50, 250 between the first region 12 and the second region 14. The fluid within the energy harvesting system 42, 142, 242 forming the first region 12 and the second region 14 may be selected from a group of gases, liquids, and combinations thereof. The fluid within the first region 12 may be a different fluid than the fluid within the second region. In the embodiment discussed above where the compartment 40 is an engine compartment, fluid within the first region 12 and the second region 14 is air within the compartment 40.

Several examples within a vehicle 10 where the energy harvesting system 42, 142, 242 may take advantage of temperature differentials are proximate to or incorporated with an exhaust system, including proximity to a catalytic converter, next to a battery for the vehicle or within a battery compartment for electric vehicles, proximate to a transmission, brakes, or components of the vehicle suspension in particular a shock absorber, or proximate to or incorporated within a heat exchanger, such as a radiator. The above examples list areas of the vehicle 10 which may act as one of the first region 12 or the second region 14. The energy harvesting system 42, 142, 242 may be positioned such that the other of the first region 12 or the second region 14 is separated by a sufficient heat exchange barrier 50, 250 to provide the required temperature differential. The above list only provides examples of where the energy harvesting system 42, 142, 242 may be located and is not intended to be all inclusive of arrangements for the energy harvesting system 42, 142, 242. One skilled in the art would be able to determine areas having an associated temperature differential and an appropriate position for the energy harvesting system 42, 142, 242 to take advantage of the temperature differences.

The energy harvesting system 42, 142, 242 also includes a driven component 20. The component 20 may be a simple mechanical device, selected from a group including a fan, a belt, a clutch drive, a blower, a pump, a compressor and combinations thereof. The component 20 is driven by the heat engine 16, 116, 216. The component 20 may be part of an existing system within the vehicle 10 such as a heating or cooling system. The mechanical energy may drive the component 20 or may assist other systems of the vehicle 10 in driving the component 20. Driving the component 20 with power provided by the heat engine 16, 116, 216 may also allow an associated existing system within the vehicle 10 to be decreased in size/capacity providing weight savings in addition to the energy savings.

Alternately, the component 20 may be a generator. The component/generator 20 is configured for converting mechanical energy from the heat engine 16, 116, 216 to electricity (represented generally by symbol EE in FIG. 1). The component/generator 20 may be any suitable device for converting mechanical energy to electricity EE. For example, the component/generator 20 may be an electrical generator that converts mechanical energy to electricity EE using electromagnetic induction, and may include a rotor (not shown) that rotates with respect to a stator (not shown). The electrical energy EE from the component/generator 20 may than be used to assist in powering the main or accessory drive systems within the vehicle 10.

As explained above, the energy harvesting system 42, 142, 242 is configured for generating mechanical or electric energy and includes structure defining the first region 12 having a first temperature and structure defining the second region 14 having a second temperature that is different from the first temperature.

In one variation, the energy harvesting system 42, 142, 242 also includes an electronic control unit 46. The electronic control unit 46 is in operable communication with the vehicle 10. The electronic control unit 46 may be, for example, a computer that electronically communicates with one or more controls and/or sensors of the energy harvesting system 42, 142, 242. For example, the electronic control unit 46 may communicate with and/or control one or more of a temperature sensor within the first region 12, a temperature sensor within the second region 14, a speed regulator of the component 20, fluid flow sensors, and meters configured for monitoring electricity generation. The electronic control unit 46 may control the harvesting of energy under predetermined conditions of the vehicle 10. For example, after the vehicle 10 has operated for a sufficient period of time to ensure that a temperature differential between the first region 12 and the second region 14 is at an optimal difference the electronic control unit 46 may start the energy harvesting system 42, 142, 242. An electronic control unit 46 may also provide the option to manually override the heat engine 16, 116, 216 to allow the energy harvesting system 42, 142, 242 to be turned off. A clutch (not shown) controlled by the electronic control unit 46 may be used to disengage the heat engine 16, 116, 216 from the component 20.

As also shown in FIG. 1, the energy harvesting system 42, 142, 242 includes a transfer medium 48 configured for conveying electricity EE from the energy harvesting system 42, 142, 242. In particular, the transfer medium 48 may convey electricity EE from the component/generator 20. The transfer medium 48 may be, for example, a power line or an electrically-conductive cable. The transfer medium 48 may convey electricity EE from the component/generator 20 to a storage device 54, e.g., a battery for the vehicle. The storage device 54 may also be located proximate to but separate from the vehicle 10. Such a storage device 54 may allow the energy harvesting system 42, 142, 242 to be utilized with a parked vehicle such as 10. For example, the energy harvesting system 42, 142, 242 may take advantage of a temperature differential created by sun load on a hood for the compartment 40 and store the electrical energy EE generated in the storage device 54.

Whether the energy from the energy harvesting system 42, 142, 242 is used to drive a component 20 directly or stored for later usage the energy harvesting system 42, 142, 242 provides additional energy to the vehicle 10 and reduces the load on the main energy sources for driving the vehicle 10. Thus, the energy harvesting system 42, 142, 242 increases the fuel economy and range for the vehicle 10. As described above, the energy harvesting system 42, 142, 242 may operate autonomously requiring no input from the vehicle 10.

It is to be appreciated that for any of the aforementioned examples, the vehicle 10 and/or the energy harvesting system 42, 142, 242 may include a plurality of heat engines 16, 116, 216 and/or a plurality of components 20. That is, one vehicle 10 may include more than one heat engine 16, 116, 216 and/or component 20. For example, one heat engine 16, 116, 216 may drive more than one component 20. Likewise, vehicle 10 may include more than one energy harvesting system 42, 142, 242, each including at least one heat engine 16, 116, 216 and component 20. Multiple heat engines 16, 116, 216 may take advantage of multiple regions of temperature differentials throughout the vehicle 10.

Figure 2:
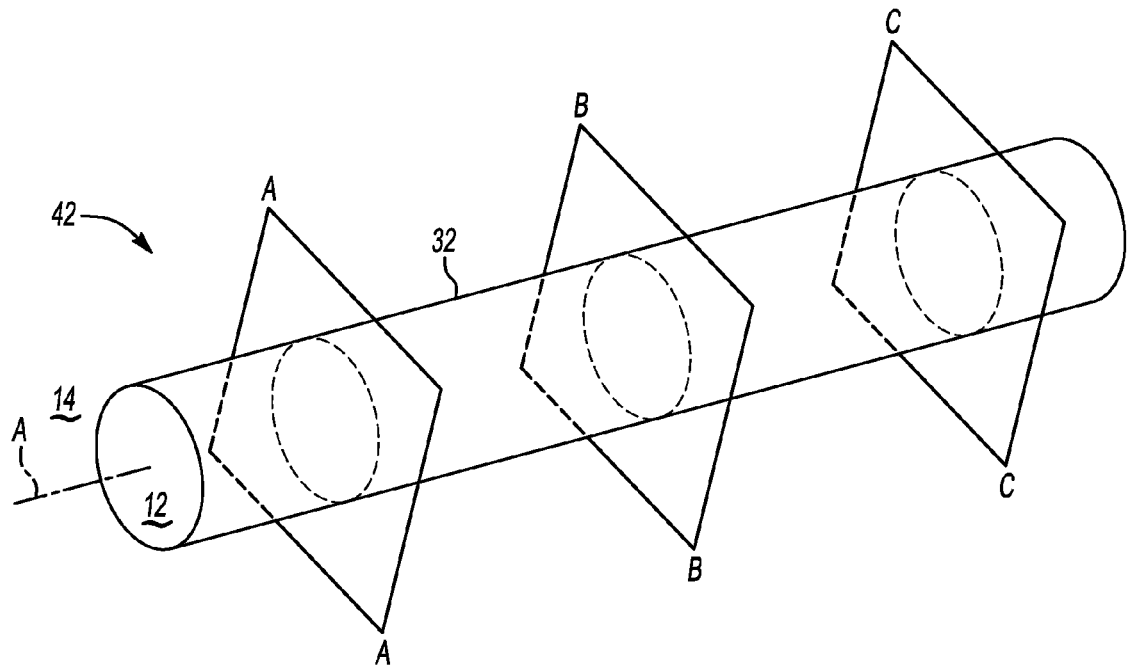
FIG. 2 is a schematic perspective view of a first embodiment of the energy harvesting system of FIG. 1.

Referring now to FIGS. 1 and 2, the heat engine 16 is configured for converting thermal energy, e.g., heat, to mechanical energy or heat to mechanical energy and then to electrical energy, as set forth in more detail below. The heat engine 16 includes a shape memory alloy 18 (FIG. 2A) having a crystallographic phase changeable between austenite and martensite at a specific temperature to which the shape memory alloy 18 is exposed in one of the first region 12 and the second region 14. In response to the temperature difference of the first region 12 and the second region 14 (FIG. 1) the shape memory alloy undergoes the crystallographic phase change while passing between the first region 12 and the second region 14. The below description is in reference to FIG. 2A. However, the shape memory alloy 18 of all the embodiments operates in a similar manner.

As used herein, the terminology "shape memory alloy" refers to alloys which exhibit a shape memory effect. That is, the shape memory alloy 18 may undergo a solid state phase change via molecular rearrangement to shift between a martensite phase, i.e., "martensite", and an austenite phase, i.e., "austenite". Stated differently, the shape memory alloy 18 may undergo a displacive transformation rather than a diffusional transformation to shift between martensite and austenite. In general, the martensite phase refers to the comparatively lower-temperature phase and is often more deformable than the comparatively higher-temperature austenite phase. The temperature at which the shape memory alloy 18 begins to change from the austenite phase to the martensite phase is known as the martensite start temperature, $M_s$. The temperature at which the shape memory alloy 18 completes the change from the austenite phase to the martensite phase is known as the martensite finish temperature, $M_f$. Similarly, as the shape memory alloy 18 is heated, the temperature at which the shape memory alloy 18 begins to change from the martensite phase to the austenite phase is known as the austenite start temperature, $A_s$. And, the temperature at which the shape memory alloy 18 completes the change from the martensite phase to the austenite phase is known as the austenite finish temperature, $A_f$.

Therefore, the shape memory alloy 18 may be characterized by a cold state, i.e., when a temperature of the shape memory alloy 18 is below the martensite finish temperature $M_f$ of the shape memory alloy 18. Likewise, the shape memory alloy 18 may also be characterized by a hot state, i.e., when the temperature of the shape memory alloy 18 is above the austenite finish temperature $A_f$ of the shape memory alloy 18.

In operation, i.e., when exposed to the temperature difference of first region 12 and the second region 14, the shape memory alloy 18, if pre-strained or subjected to tensile stress, can change dimension upon changing crystallographic phase to thereby convert thermal energy to mechanical energy. That is, the shape memory alloy 18 may change crystallographic phase from martensite to austenite and thereby dimensionally contract if pseudoplastically pre-strained so as to convert thermal energy to mechanical energy. Conversely, the shape memory alloy 18 may change crystallographic phase from austenite to martensite and if under stress thereby dimensionally expand so as to convert thermal energy to mechanical energy.

Pseudoplastically pre-strained refers to stretching the shape memory alloy 18 while in the martensite phase so that the strain exhibited by the shape memory alloy 18 under that loading condition is not fully recovered when unloaded, where purely elastic strain would be fully recovered. In the case of shape memory alloy 18, it is possible to load the material such that the elastic strain limit is surpassed and deformation takes place in the martensitic crystal structure of the material prior to exceeding the true plastic strain limit of the material. Strain of this type, between those two limits, is pseudoplastic strain, called such because upon unloading it appears to have plastically deformed, but when heated to the point that the shape memory alloy 18 transforms to its austenite phase, that strain can be recovered, returning the shape memory alloy 18 to the original length observed prior to any load applied. Shape memory alloy 18 is typically stretched before installation into the heat engine 18, such that the nominal length of the shape memory alloy 18 includes that recoverable pseudoplastic strain, which provides the motion used for actuating/driving the heat engine 16. Without pre-stretching the shape memory alloy 18, little deformation would be seen during phase transformation.

The shape memory alloy 18 may have any suitable composition. In particular, the shape memory alloy 18 may include an element selected from the group including cobalt, nickel, titanium, indium, manganese, iron, palladium, zinc, copper, silver, gold, cadmium, tin, silicon, platinum, gallium, and combinations thereof. For example, suitable shape memory alloys 18 may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations thereof. The shape memory alloy 18 can be binary, ternary, or any higher order so long as the shape memory alloy 18 exhibits a shape memory effect, e.g., a change in shape orientation, damping capacity, and the like. A skilled artisan may select the shape memory alloy 18 according to desired operating temperatures within the compartment 40 (FIG. 1), as set forth in more detail below. In one specific example, the shape memory alloy 18 may include nickel and titanium.

Figure 2A:
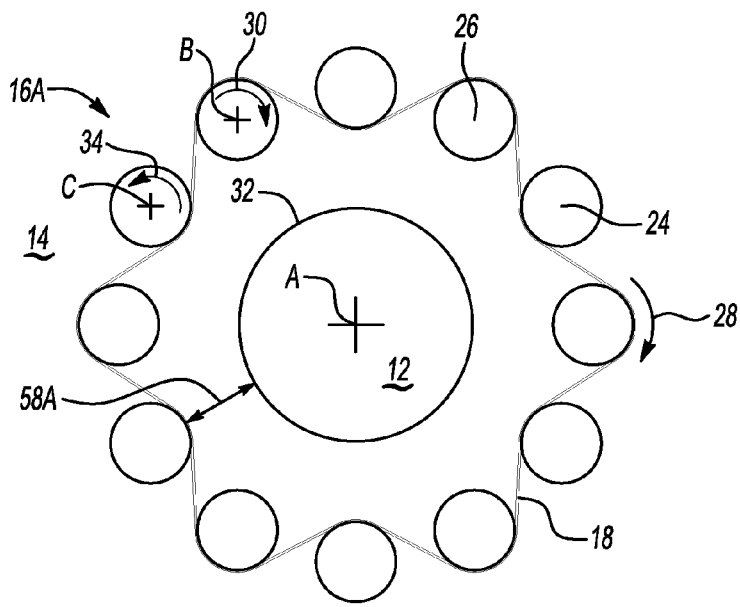
FIG. 2A is a schematic cross-sectional view of the first embodiment of the energy harvesting system of FIGS. 1 and 2 taken along cross-section A-A of FIG. 2.

Further, the shape memory alloy 18 may have any suitable form, i.e., shape. For example, the shape memory alloy 18 may have a form selected from the group including bias members (such as springs), tapes, wires, bands, continuous loops, and combinations thereof. Referring to FIG. 2A, in one variation, the shape memory alloy 18 may be formed as a continuous loop spring.

The heat engine 16, and more specifically, the shape memory alloy 18 (FIG. 2A) of the heat engine 16, is disposed in thermal contact or heat exchange relation with each of the first region 12 and the second region 14. Therefore, the shape memory alloy 18 may change crystallographic phase between austenite and martensite upon thermal contact or heat exchange relation with one of the first region 12 and the second region 14. For example, upon contact with the first region 12, the shape memory alloy 18 may change from martensite to austenite. Likewise, upon contact with the second region 14, the shape memory alloy 18 may change from austenite to martensite.

Further, the shape memory alloy 18 may change both modulus and dimension upon changing crystallographic phase to thereby convert thermal energy to mechanical energy. More specifically, the shape memory alloy 18, if pseudoplastically pre-strained may dimensionally contract upon changing crystallographic phase from martensite to austenite and may dimensionally expand, if under tensile stress, upon changing crystallographic phase from austenite to martensite to thereby convert thermal energy to mechanical energy. Therefore, for any condition wherein the temperature difference exists between the first temperature of the first region 12 and the second temperature of the second region 14, i.e., wherein the first region 12 and the second region 14 are not in thermal equilibrium, the shape memory alloy 18 may dimensionally expand and contract upon changing crystallographic phase between martensite and austenite. And, the change in crystallographic phase of the shape memory alloy 18 may cause the shape memory alloy to rotate the pulleys 24, 26 (shown in FIG. 2A) and, thus, drive the component 20.

Figure 2B:
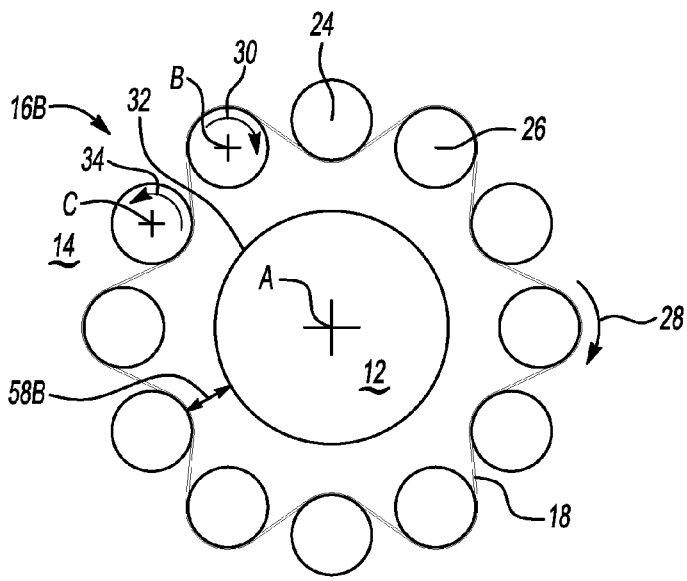
FIG. 2B is another schematic cross-sectional view of the first embodiment of the energy harvesting system of FIGS. 1-2 taken along cross-section B-B of FIG. 2.
Figure 2C:
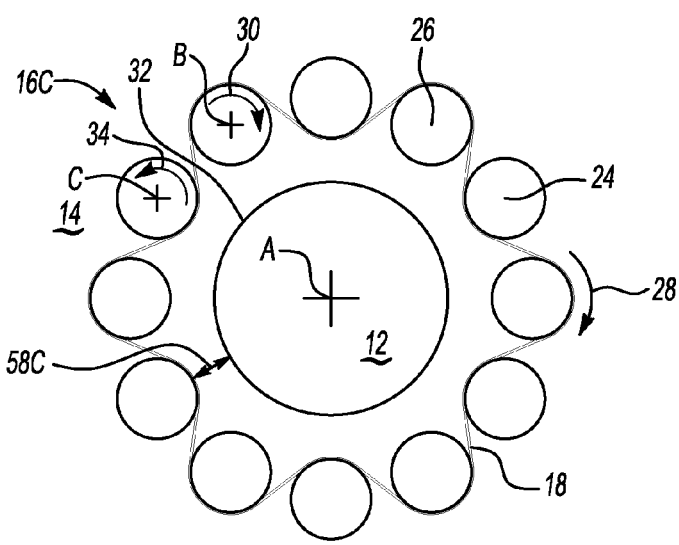
FIG. 2C is another schematic cross-sectional view of the first embodiment of the energy harvesting system of FIGS. 1-2B taken along cross-section C-C of FIG. 2.

Referring to FIGS. 2-2C, an embodiment of multiple heat engines 16A-C for use with an energy harvesting system 42 for a vehicle 10 (shown in FIG. 1) is shown. For each of the heat engines 16A-C a plurality of inner pulleys 24 and a plurality of outer pulleys 26 are generally concentrically arranged about a conduit 32 and driven to rotate by at least one continuous loop of the shape memory alloy 18. The pipe or conduit 32 which generally surrounds or is located within the first region 12. Fluid may flow through the conduit 32. Although the first region 12 may be mostly or entirely located within the conduit 32, the shape memory alloy 18 is in thermal contact or heat exchange relationship with the first region 12.

Multiple heat engines 16A-C are arranged along the conduit 32. FIGS. 2A-2C illustrate the heat engines 16A, 16B, 16C in reference to three locations along the conduit 32. More or fewer heat engines 16A-C may be utilized to provide a cumulative output for the energy harvesting device 42. That is, at least one of the pulleys 24, 26 for each of the heat engines 16A-C may be connected to the component 20 (shown in FIG. 1) to provide a combined output for all the heat engines 16A-C in the energy harvesting device. In this manner an energy harvesting device 42 may take advantage of cascading elements of multiple heat engines 16A-C, as described in further detail below.

For each heat engine 16A-C the inner pulleys 24 and the outer pulleys 26 are arranged in an alternating pattern. The shape memory alloy 18 forms a continuous loop that wraps around a radial interior of the inner pulleys 24 and a radial exterior of the outer pulleys 26. The radial interior and radial exterior directions are relative to the radial relationship with respect to the first axis A. The shape memory alloy 18 is under tension sufficient that there is not slack on the continuous loop of the shape memory alloy 18.

The temperature differential between the first region 12 and the second region 14 causes the shape memory alloy 18 to sufficiently dimensionally contract or expand in order to rotate the outer pulleys 26 in a second rotational direction 30 and the inner pulleys 24 in a third rotational direction 34. The second rotational direction 30 is opposing to the first rotational direction 28 and the third rotational direction 34. The outer pulleys 26 rotate about second axes B and the inner pulleys 24 rotate about third axes C both of which are parallel to the first axis. The sufficient dimensional contraction or expansion of localized regions of the shape memory alloy 18 cause the shape memory alloy 18 to rotate around the conduit 32 and through the inner pulleys 24 and outer pulleys 26. The inner pulleys 24 and/or outer pulleys 26 may be connected to the component 20 (shown in FIG. 1) such that the rotation of the inner pulleys 24 and/or outer pulleys 26 relative to the conduit 32 may drive the component 20.

Speed of rotation of the plurality of inner pulleys 24 and/or the plurality of outer pulleys 26 relative to the component 20 may optionally be modified by one or more gear sets (not shown). Additionally, the temperature differential between the first region 12 and the second region 14 will increase with distance from the conduit 32. Therefore, the distance between the second axes B and the third axes C may be increased or decreased as required to allow the shape memory alloy 18 more or less distance between the inner portion of the inner pulley 24 and the outer portion of the outer pulleys 26. Thus, increasing or decreasing the temperature differential experienced by the shape memory alloy 18 may change the overall speed of movement of the heat engine 16A-C. One skilled in the art would be able to determine the optimal distance between the second axes B and the third axes C for a given shape memory alloy 18 and energy harvesting device 42.

The multiple loops of the shape memory alloy 18 each have sufficient dimensional contraction and expansion at multiple localized regions about their circumference, which creates a cumulative driving torque on the inner pulleys 24 and the outer pulleys 26.

The inner pulleys 24 and the outer pulleys 26 for each of the heat engines 16A-C may be positioned to provide a desired physical gap 58A-C between the shape memory alloy 18 and the first region 12. As illustrated, the size of the gap 58A-C may require that greater or fewer inner pulleys 24 and outer pulleys 26 may be used. Alternatively, the size of the inner pulleys 24 and/or the outer pulleys 26 may be changed to provide sufficient circumference about the conduit 32. The inner pulleys 24 and the outer pulleys 26 may be sized to provide sufficient physical distance to ensure an ideal or sufficient heat exchange relation between the shape memory alloy 18 and the first region 12 and the second region 14.

The gap 58A-C may also be sized to take advantage of any differences in thermal gradients along the length of the conduit 32. For example, if the first region 12 is a heat source that has a decreasing temperature along the length of the conduit 32 each successive heat engine 16A-C may have the inner pulleys 24 and/or the outer pulleys 26 located closer to the conduit 32, i.e. the gaps 58A-C are successively smaller for each heat engine 16A-C. Alternatively, the gaps 58A-C for each of the heat engines 16 may be the same, but the shape memory alloys 118 may undergo crystallographic phase change at different temperatures. Thus, the heat engines 16A-C may take advantage of different temperature differentials between the first region 12 and the second region 14 along the length of the conduit 32.

Figure 3:
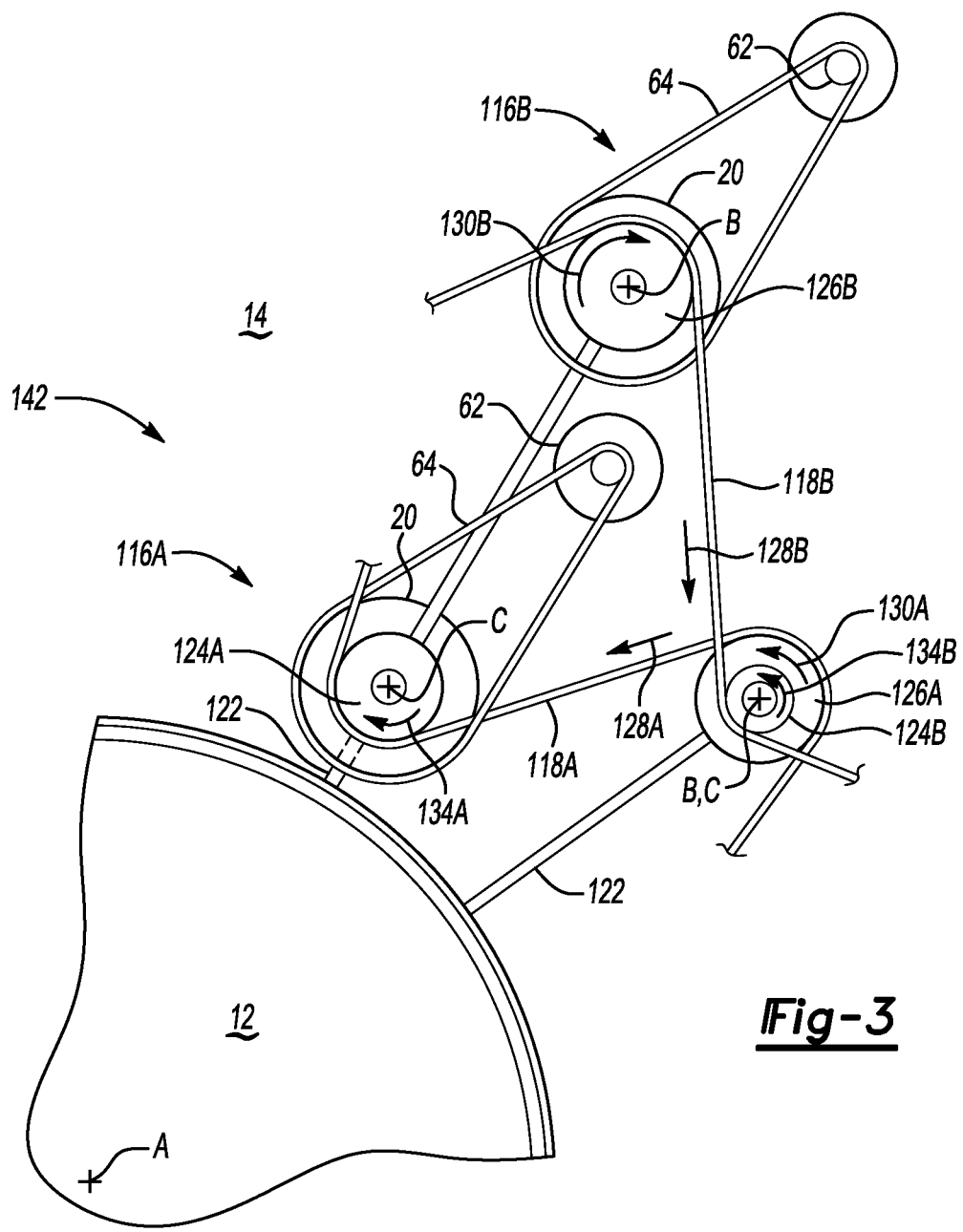
FIG. 3 is a partial schematic end view of a second embodiment of the energy harvesting system of FIG. 1.

FIG. 3 is a perspective view of a second embodiment of the energy harvesting system 142. A partial view of a conduit 132, a first heat engine 116A, and a second heat engine 116B are shown. The first and second heat engines 116A-B surrounds the conduit 132 and both operate in a manner as described of the heat engine 16A-C in the first embodiment shown above. The shape memory alloy 118A-B is under tension sufficient that there is not slack on the continuous loops of the shape memory alloy 118A-B. The first heat engine 116A is arranged concentrically around the conduit 132 and the second heat engine 116B is arranged concentrically around the first heat engine 116A. Additionally heat engine 116A-B may each be successively arranged concentrically around one another in a similar manner.

The first shape memory alloy 118A and the second shape memory alloy 118B rotate or "walk" around the first axis A in a first direction 128A-B. A first plurality of outer pulleys 126A (only one shown) and a second plurality of outer pulleys 126B (only one shown) rotate about second axes B in a second direction 130A-B. A first plurality of inner pulleys 124A (only one shown) and a second plurality of inner pulleys 124B (only one shown) rotate about third axes C, in a third direction 134A-B. As can be seen the first plurality of outer pulleys 126A and the second plurality of inner pulleys 124B are mounted to the same support 122. However, the first plurality of outer pulleys 126A and the second plurality of inner pulleys 124B may rotate in opposing directions as one another. Alternatively, the plurality of outer pulleys 126A and the second plurality of inner pulleys 124B may rotate in the same direction as one another, and the shape memory alloys 118A-B will rotate or "walk" about the conduit 32 in opposing directions, as shown.

A motor/generator 20 is connected to at least one of the first plurality inner pulleys 124A and at least one of the second plurality of outer pulleys 126B. As localized regions of the shape memory alloy 118A-B are exposed to the first region 12 and the second region 14 the inner pulleys 124A-B and the outer pulleys 126A-B are driven to rotate. The rotation of at least one of the first plurality of inner pulleys 124A and at least one of the second plurality of outer pulleys 126B drive the motor/generator 20 that is connected thereto. An auxiliary pulley 62 and auxiliary belt 64 are connected to each of the motor/generators 20. The auxiliary belt 64 transfers the output from the motor/generators 20. Additional motor/generators 20 may be connected to and driven by the other of the first plurality inner pulleys 124A and the second plurality of outer pulleys 126B of the heat engine 116A-B. One skilled in the art would be able to determine the number of motor/generators 20 to connect to the heat engine 116A-B for a particular energy harvesting device 142 and heat source.

Additionally, although the motor/generator 20 is illustrated as being driven by at least one of the first plurality inner pulleys 124A and at least one of the second plurality of outer pulleys 126B the motor/generator 20 may alternatively be driven by any or all of the plurality of inner pulleys 124A-B and plurality of outer pulleys 126A-B. The output of each of the motor/generators 20 may be transferred to the auxiliary pulleys 62 and/or may be combined with one another to provide power to various vehicle 10 accessories.

Therefore, in the embodiment described above, multiple heat engines 116A-B are arranged around the conduit 132. FIG. 3 illustrates the heat engines 116A, and 116B. More or fewer heat engines 116A-B may be utilized to provide a cumulative output for the energy harvesting device 142. That is, as shown at least one of the pulleys 124A-B, 126A-B for each of the heat engines 116A-B is connected to the motor/generator 20 to provide a combined output for all the heat engines 116A-B in the energy harvesting device 142. In this manner an energy harvesting device 142 may take advantage of cascading elements of multiple heat engines 116.

The distance between the first heat engine 116A and the conduit 132 and the second heat engine 116B and the conduit 132 may also be sized to take advantage of the thermal gradient in the radially outward directions from the conduit 132. For example, if the first region 12 is a heat source a decreasing temperature occurs in the radially outward direction from the conduit 132 and each successive heat engine 116A-B may take advantage of the temperature difference created. Therefore, the shape memory alloys 118A-B may undergo crystallographic phase change at different temperatures. Thus, the heat engines 116A-B may take advantage of a greater range of the temperature differential between the first region 12 and the second region 14 and harvest an overall larger amount of the wasted heat.

Referring to FIG. 4, a third embodiment of multiple heat engines 216A-B for use with an energy harvesting system 242 for the vehicle 10 (shown in FIG. 1) is shown. For each of the heat engines 216A-B an inner pulley 224A-B and an outer pulley 226A-B are driven to rotate by a plurality of parallel continuous loops of shape memory alloy 218A-B. The shape memory alloy 218A-B is under tension sufficient that there is not slack on the continuous loop of the shape memory alloy 218A-B. A heat source or conduit 232 is the first region 12 or is generally located within the first region 12. Fluid may flow through the conduit 232 such as exhaust through an exhaust pipe or radiator fluid through a radiator hose. The shape memory alloy 218A-B is in thermal contact or heat exchange relationship with the first region 12.

Multiple heat engines 216A-B are arranged along the conduit 232. FIG. 4 illustrates two heat engines 216A and 216B. More or fewer heat engines 216A-B may be utilized to provide a cumulative output for the energy harvesting device 242. At least one of the pulleys 224A-B, 226A-B for each of the heat engines 216A-B is connected to a motor/generator 20 to provide a combined output for all the heat engines 216A-B in the energy harvesting device 242. In this manner, the energy harvesting device 42 may take advantage of cascading elements of multiple heat engines 216A-B, as described in further detail below.

For each heat engine 216A-B a continuous loop of the shape memory alloy 218A-B wraps around the inner pulley 224A-B and the outer pulley 226A-B. A support 222 is used to rotatably support the inner pulley 224A-B and the outer pulley 226A-B. The temperature differential between the first region 12 and the second region 14 causes the shape memory alloy 218 to sufficiently dimensionally contract or expand in order to rotate the inner pulley 224A-B and the outer pulley 226A-B. The sufficient dimensional contraction or expansion of the localized regions of the shape memory alloy 218A-B causes the shape memory alloy 218A-B to rotate. For both heat engine 216A-B the inner pulley 224A-B and/or the outer pulley 226A-B may be connected to the motor/generator 20 such that the rotation of the inner pulley 224A-B and/or outer pulley 226A-B may drive the motor/generator 20.

Speed of rotation of the inner pulleys 224A-B and/or the outer pulleys 226A-B relative to the motor/generator 20 may optionally be modified by one or more gear sets (not shown). Additionally, the temperature differential between the first region 12 and the second region 14 will increase with distance from the conduit 232. Therefore, the distance between the inner pulley 224A-B and the outer pulley 226A-B for each heat engine 216A-B may be increased or decreased as required to allow the shape memory alloy 218A-B more or less distance between the inner pulley 224A-B and the outer pulley 226A-B. Thus, increasing or decreasing the temperature differential experienced by the shape memory alloy 218A-B and the overall speed of movement of the heat engines 216A-B. One skilled in the art would be able to determine the optimal distance between the inner pulley 224A-B and the outer pulley 226A-B for a given shape memory alloy 218A-B and heat engine 216A-B.

The distance between the first heat engine 216A and the conduit 232 and the second heat engine 216B and the conduit 232 may be sized to take advantage of any differences in thermal gradients along the length of the conduit 232. For example, if the first region 12 is a heat source that has a decreasing temperature along the length of the conduit 232 each successive heat engine 216A-B may have the inner pulley 224A-B and/or the outer pulley 226A-B located closer to the conduit 232. Alternatively, the distance between the first heat engine 216A and the conduit 232 and the second heat engine 216B and the conduit 232 for each of the heat engines 216A-B may be the same, but the shape memory alloys 218A-B may undergo crystallographic phase change at different temperatures. Thus, the heat engines 216A-B may take advantage of different temperature differentials between the first region 12 and the second region 14.

A barrier or vane 250 is secured to the support 222 and extends from the support 222 toward the successive heat engine 216A-B. As fluid flows past the shape memory alloy 218A-B the temperature of the fluid F is changed due to the heat exchange relationship with the shape memory alloy 218A-B. For example, when the first region 12 is a heat source, such as an exhaust pipe or a radiator hose for a vehicle 10, as fluid F flows past the shape memory alloy 218A heat is absorbed by the shape memory alloy 218A in the area of the inner pulley 224A which is in the first region 12 and is radiated from the shape memory alloy 218A in the area of the outer pulley 226A which is in the second region 14. Therefore, the fluid F within the second region 14 after it has passed the first shape memory alloy 218A has increased in temperature from the radiant heat of the shape memory alloy 218A. The vane 250 may than direct this fluid F back toward the first region 12 for the second heat engine 216B to combine with the fluid F from the heat source or conduit 232. This also allows cooler fluid F from the other side of the vane 250 to be directed toward the second region 14, around the outer pulleys 226B, of the second heat engine 216B.

Therefore, the vane 250 may direct air flow after it has passed though the heat engine 216A to assist in separating the first region 12 and the second region 14 for the successive heat engine 216A-B. That is, the vane 250 for the first heat engine 216A is used to assist in separating the first region 12 from the second region 14 for the second heat engine 216B. A cowl or barrier 66 is used in front of the first heat engine 216A to assist in separating the first region 12 and the second region 14 for the first heat engine 216A. Temperature responsive directive flaps 68 may be used to control the position for the cowl 66 and each of the barriers 250. The cowl 66 and the barriers 250 may act independently from one another.

While the best modes for carrying out the invention have been described in detail, those familiar with the art to which this invention relates will recognize various alternative designs and embodiments for practicing the invention within the scope of the appended claims.

The invention claimed is:

1. A method of harvesting energy comprising:
   driving a plurality of heat engines to convert thermal energy to mechanical energy, wherein driving the plurality of heat engines includes:
   exposing localized regions of a continuous loop of a shape memory alloy for each of the plurality of heat engines to heat exchange contact with a first region and a second region having a temperature difference therebetween, wherein the continuous loop of the shape memory alloy for each of the plurality of heat engines has a crystallographic phase changeable between austenite and martensite in response to the temperature difference between the first region and the second region, wherein exposing the localized regions of the continuous loop of the shape memory alloy for each of the plurality of heat engines to heat exchange contact with the first region and the second region further comprises adjusting a barrier operatively connected to a first of the plurality of heat engines to thereby adjust the temperature difference between the first region and the second region for a successive one of the plurality of heat engines;
   expanding and contracting the localized regions of the continuous loop of the shape memory alloy in response to the temperature difference between the first region and the second region; and
   rotating the continuous loop of the shape memory alloy in response to expanding and contracting the localized regions of the continuous loop of the shape memory alloy;
   rotating at least one pulley with the continuous loop of each of the plurality of heat engines; and
   driving a component with the rotation of the at least one pulley.

2. An energy harvesting system comprising:
   a first region and a second region having a temperature difference therebetween;
   a conduit located at least partially within the first region;
   a plurality of heat engines, located proximate to the conduit and configured for converting thermal energy to mechanical energy, wherein each of the plurality of heat engines includes a shape memory alloy forming at least one generally continuous loop under tension, and wherein the shape memory alloy is driven to rotate by heat exchange contact with the first region and the second region; and
   at least one pulley for each of the plurality of heat engines driven by the rotation of the respective shape memory alloy, wherein each of the at least one pulleys is operatively connected to a component to thereby drive the component, wherein the at least one pulley for each of the plurality of heat engines further comprises a plurality of inner pulleys and a plurality of outer pulleys rotatably mounted to a support in an alternating relationship to one another, and wherein the shape memory alloy is alternately threaded about an interior of the plurality of inner pulleys and an exterior of the outer pulleys to form the at least one continuous loop surrounding the conduit, and wherein the plurality of outer pulleys for one of the heat engines rotates about the same axes as the plurality of inner pulleys for the successive heat engine.

3. The energy harvesting system of claim 2, wherein each of the plurality of heat engines is arranged concentrically about the conduit.

4. The energy harvesting system of claim 3, wherein a first of the plurality of heat engines is arranged concentrically about the conduit and the remaining plurality of heat engines are successively arranged concentrically about one another.

5. The energy harvesting system of claim 3, wherein the plurality of heat engines are successively arranged along the length of the conduit.

6. The energy harvesting system of claim 5, wherein the shape memory alloy for at least one of the plurality of successive heat engines is a different composition from the prior of the shape memory alloys such that the successive heat engines take advantage of a heat gradient within the first region along the length of the conduit.

7. The energy harvesting system of claim 6, wherein each of the plurality of the heat engines further comprise a plurality of inner pulleys and a plurality of outer pulleys rotatably mounted to the support in an alternating relationship to one another, and wherein the shape memory alloy is alternately threaded about an interior of the plurality of inner pulleys and an exterior of the outer pulleys to form the at least one continuous loop surrounding the conduit.

8. The energy harvesting system of claim 7, wherein the shape memory alloy further comprises a plurality of continuous loops each threaded in the same alternating relationship among the plurality of the inner pulleys and the plurality of the outer pulleys.

9. The energy harvesting system of claim 7, wherein the inner pulleys are at least partially located within the first region and the outer pulleys are at least partially located within the second region.

10. A vehicle comprising:
a conduit for the vehicle;
a first region surrounding a conduit;
a second region at least partially surrounding the first region, wherein there is a temperature difference between the first region and the second region;
a plurality of heat engines configured for converting thermal energy to mechanical energy including:
a support;
a plurality of inner pulleys concentrically located about the conduit;
a plurality of outer pulleys concentrically located about the conduit in an alternating relationship with the inner pulleys;
at least one continuous loop of a shape memory alloy placed under tension and alternately threaded about an interior of the plurality of inner pulleys and an exterior of the outer pulleys surrounding the conduit;
wherein the shape memory alloy is disposed in heat exchange contact with each of the first region and the second region such that at least one of the plurality of inner pulleys and the plurality of outer pulleys is driven to rotate by the shape memory alloy in response to the temperature difference between the first region and the second region;
wherein the shape memory alloy for at least one of the plurality of successive heat engines is a different composition from the prior of the shape memory alloys such that the successive heat engines take advantage of a heat gradient along a radial distance from the conduit; and
a component of the vehicle driven by the rotation of the at least one of the plurality of inner pulleys and the plurality of outer pulleys; and
wherein a first of the plurality of heat engines is arranged concentrically about the conduit and the remaining plurality of heat engines are successively arranged concentrically about one another.

11. The vehicle of claim 10, wherein the conduit is one of an exhaust pipe and a radiator hose for the vehicle.

12. The vehicle of claim 10, wherein the plurality of outer pulleys for one of the heat engines rotates about the same axes as the plurality of inner pulleys for the successive heat engine.

* * * * *